United States Patent
Lin et al.

(10) Patent No.: US 6,185,519 B1
(45) Date of Patent: Feb. 6, 2001

(54) METHOD AND SYSTEM FOR FEATURE INTERACTION DETECTION IN A TELECOMMUNICATION NETWORK

(75) Inventors: Fuchun Joseph Lin, Morris Plains; Abhrajit Ghosh, Scotch Plains; Hong Liu, Parsippany, all of NJ (US)

(73) Assignee: Telcordia Technologies, Inc., Morristown, NJ (US)

( * ) Notice: Under 35 U.S.C. 154(b), the term of this patent shall be extended for 0 days.

(21) Appl. No.: 09/204,019

(22) Filed: Dec. 1, 1998

Related U.S. Application Data

(60) Provisional application No. 60/074,245, filed on Feb. 10, 1998.

(51) Int. Cl.[7] .................................................. G06N 5/00
(52) U.S. Cl. .............................. 703/21; 703/17; 703/22; 370/242
(58) Field of Search .............................. 703/13, 22, 17, 703/21; 714/37, 38, 47; 370/242

(56) References Cited

U.S. PATENT DOCUMENTS

| | | | |
|---|---|---|---|
| 5,337,351 | * | 8/1994 | Manabe et al. ........................ 379/201 |
| 5,388,258 | * | 2/1995 | Larsson et al. ....................... 707/104 |
| 5,448,631 | * | 9/1995 | Cain ...................................... 379/201 |
| 5,796,950 | * | 8/1998 | Sips et al. ............................. 709/218 |
| 5,946,474 | * | 8/1999 | Skogby .................................. 703/13 |

OTHER PUBLICATIONS

Evers, K. et al., "An Algorithmic Approach for Feature Interaction Detection," IEEE Intelligent Network Workshop, vol. 2, May 1997, pp. 1–14.*

Nakamura, M. et al., "Analyzing Non–Deteminism in Telecommunication Services Using P–Invariant of Petri–Net Model," 16th Annual Joint Conf. of IEEE Computer and Communications Societies, INFOCOM '97, vol. 3, Apr. 1997, pp. 1253–1260.*

Cheung, T. et al., "Detecting and Resolving the Interaction Between Telephone Features: Terminating Call Screening and Call Forwarding by Colored Petri–Nets," IEEE Int'l Conf. on Systems, Man and Cybernetics, vol. 3, Oct. 1995, pp. 2245–2250.*

(List continued on next page.)

Primary Examiner—Kevin J. Teska
Assistant Examiner—Kyle J. Choi
(74) Attorney, Agent, or Firm—Joseph Giordano

(57) ABSTRACT

Methods and systems disclosed efficiently detect potential interactions between features in a telecommunications network. The methods and systems specify AIN (Advanced Intelligent Network) and switch-based features and detect their interactions when present within a feature package provided to a single subscriber. The methodology supports the assumption that each feature is created without the knowledge of other features, and that each feature is specified as a "black box," i.e., nothing is known about its internal logic except its input/output behaviors. The invention models a call environment, models two or more features, and combines the call variable usage for each feature. Methods then compare the combined call variable usages to detect potential feature interactions. The invention assists a service mediator in the tasks of detecting potential interactions among AIN features provided by different third party service providers, and detecting potential interactions between a third party service provider's AIN features and switch-based features.

12 Claims, 8 Drawing Sheets

OTHER PUBLICATIONS

Nakamura, M. et al., "A Method for Detecting and Eliminating Feature Interactions Using a Frame Model," IEEE Int'l Conf. on Communications, ICC '95, vol. 1, Jun. 1995, pp. 99–103.*

Kelly, B. et al., "Feature Interaction Detection Using SDL Models," IEEE Global Telecommunications Conference, Globecom '94, vol. 3, Dec. 1994, pp. 1857–1861.*

Brothers, L.R. et al., "Feature Interaction Detection," IEEE Int'l Conf. on Communications, ICC '93. vol. 3, May 1993, pp. 1553–1557.*

Kang, M. et al., "The Design and Verification of Service Feature Interaction Manager on AIN Using Z Schema," Proc. of 20th Int'l Computer Software and Applications Conf., Compsac '96, Aug. 1996, pp. 477–482.*

Cameron, E. J. et al., "Feature Interactions in Telecommunications Systems," IEE Communications Magazine, vol. 31, No. 8, Aug. 1993, pp. 18–23.*

McConnell, V. K. et al., "Feature Interaction Analysis in the Advanced Intelligent Network: A Telephone Company Perspective," IEEE Int'l Conf. on Communications, ICC '93, vol. 3, May 1993, pp. 1548–1552.*

Dworak, F.S., "Approaches to Detecting and Resolving Feature Interactions," Global Telecommunications Conf., Globecom '91, vol. 2, Dec. 1991, pp. 1371–1377.*

Liljegren, S. et al., "Fine—a Feature Design Environment," 7th Int'l Conf. on Software Engineering for Telecommunication Switching Systems, SETSS '89, 1989, pp. 122–126.*

Aiken, D.J. "Experiences of Implementation Using Advanced Intelligent Network Release 1 Architecture," 8th Int'l Conf. on Software Engineering for Telecommunication System and Services. 1992, pp. 19–26.*

Aiken, D.J. "An Approach to Resolving Feature Interaction in Advanced Intelligent Network Services," 4th IEE Conf. on Telecommunications. 1993, pp. 221–228.*

Blumenthal, R. et al. "A Practical Approach to a Usable IN Feature Interaction Tool," IEEE Intelligent Network Workshop (IN '96). 1996, Apr. 1996, pp. 1–12.*

The Feature Interaction Problem in Telecommunication Systems, by Bowen, T.F. et al., published in the Proceedings of the 7th International Conference on Software Engineering for Telecommunication Switching Systems, pp. 59–62, Jul. 1989.

* cited by examiner

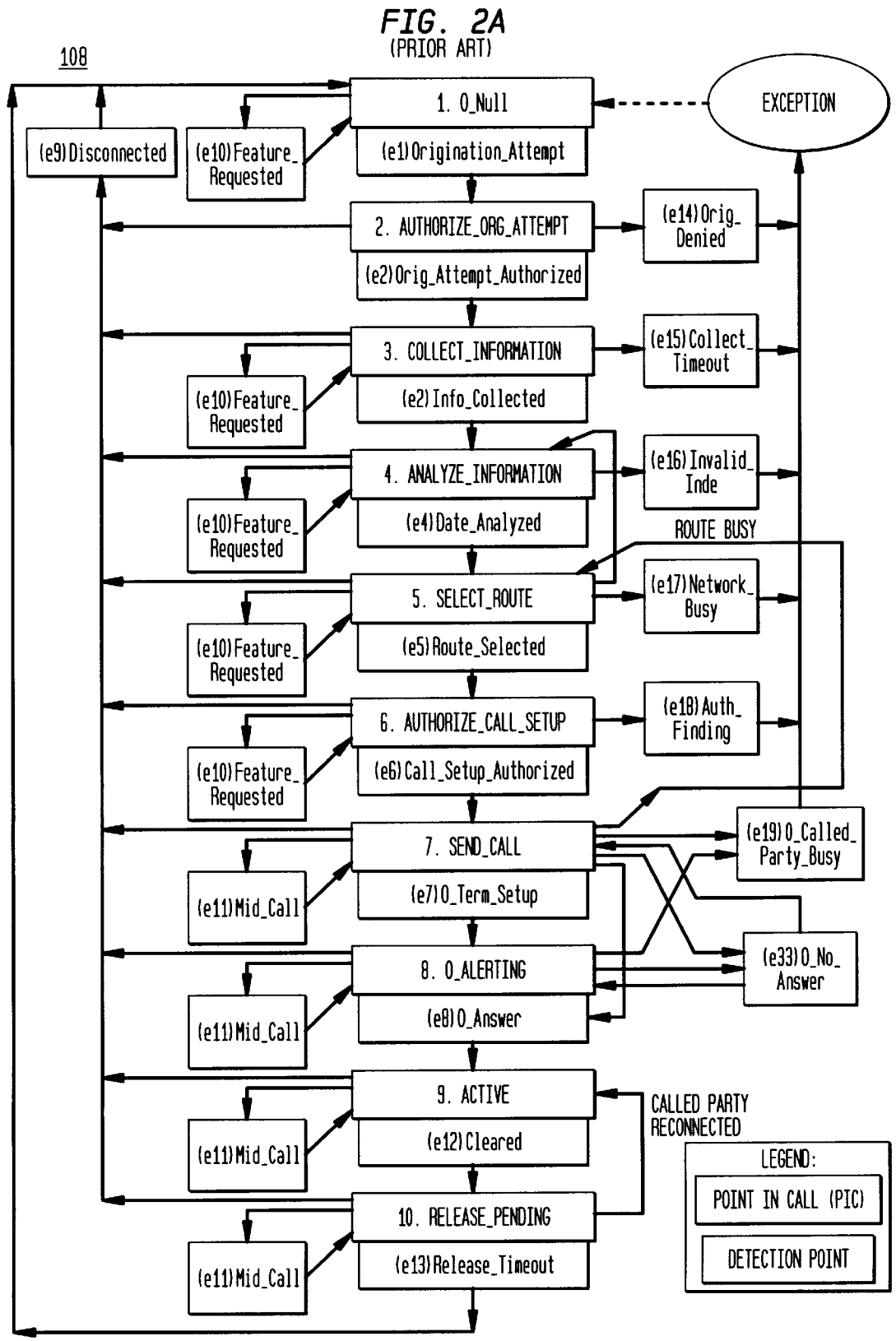

METHOD AND SYSTEM FOR FEATURE INTERACTION DETECTION IN A TELECOMMUNICATION NETWORK

CROSS-REFERENCE TO RELATED APPLICATIONS

This application claims the benefit of U.S. Provisional Application Ser. No. 60/074,245, filed Feb. 10, 1998, the contents of which are hereby incorporated by reference.

BACKGROUND OF THE INVENTION

The present invention generally relates to telecommunications and, more particularly, to feature interaction in the AIN (Advanced Intelligent Network) Framework.

Telecommunications software continues to evolve and add features. For example, in a telephone network, a feature is an add-on functionality to standard telephone service (e.g., call forwarding). The correct operation of a feature depends on a number of assumptions about its execution environment and available resources. Individual features are usually developed in isolation from each other and/or over a long period of time. When a set of features is put together, they might compete for limited system resources, and some of the underlying assumptions of a feature might be invalidated because of the execution of other features. As a result, a set of features might interfere with one another and exhibit unexpected and/or undesirable behaviors. This is the well-known "feature interaction" problem in telecommunications software engineering, which is further described in "The Feature Interaction Problem in Telecommunication Systems" by Bowen, T. F. et al., In Proceedings of the 7$^{th}$ International Conference on Software Engineering for Telecommunication Switching Systems, pp. 59–62, July 1989.

It is important to detect and resolve interactions among features before they are packaged for commercial offerings. Revenues are at stake if customers are baffled by the unexpected behavior of the set of features they subscribe to from a service provider. However, detecting and resolving interactions among features is a very difficult task. First, the logic of some of the features can be very complicated: it is not unusual for the documentation of a complex feature to run close to a hundred pages. Extracting the right amount of information from a document for interaction analysis requires a keen insight into feature design. Second, it is not unusual for a switching system to have hundreds of features. In addition, pairwise feature interaction analysis is not sufficient to uncover all the interactions among a set of features. As a result, even if one has access to all the information on the features developed for one's own products, one has to deal potentially with an exponential number of cases in the analysis.

The feature interaction problem has become even more complicated with the advent of the Advanced Intelligent Network (AIN) and the government deregulation in the telecommunications industry. In the AIN architecture, service logic can be stored at a Service Control Point (SCP), while the switching functions are provided in the Service Switching Point (SSP). The SSP is further described in TR-NWT001284: "Advanced Intelligent Network (AIN) Switching Systems Generic Requiremeits (Release 0.1)" by Bellcore, August 1992. Similarly, the SCP is a computing system containing processing logic and is further described in TR-NWT001285: "Advanced Intelligent Network (AIN) 0.1 Switch-Service Control Point (SCP) Application Protocol Interface Generic Requirements" by Bellcore, August 1992. In addition, AIN provides a set of well-defined interfaces between the SSP and the SCP to allow service logic programs in the SCP to be invoked by the SSP and to influence call processing in the SSP. The separation of service logic fiom switching functions allows service providers to develop features independent of switch vendors.

The passing of the Telecommunications Act of 1996 requires Incumbent Local Exchange Carriers (ILECs) to unbundle "dial tones" to third party service providers (i.e. other Competing LECs or CLECs). The unbundling of ILECs' networks can create the scenario in which ILECs may have to provide mediated access to features developed by third party service providers due to future FCC or state mandates. In this context, features can be classified into two categories: (1) "switch-based features," which usually come from the switch vendors and reside on the switches; and (2) "AIN features," which are usually developed by operating phone companies and third party service providers. Due to competition among third party service providers and between third party service providers and operating phone companies, only limited input/output behaviors are publicly available for each feature. Consequently, the operating phone companies face the challenge of providing mediated access for third party features without knowing the internal logic of these features.

Feature Interaction Problem in AIN Release 0.1

FIG. 1 shows two service SSPs 102 in an AIN 0.1 environment. The SSPs 102 are connected across a network 106 that may contain other SSPs switching points and various nodes between the end points. The SSPs 102 shown in the figure are also each connected to a SCP 104.

At the heart of AIN is the "basic call model" (BCM), which is a finite state machine residing on an SSP 102 that models the progress of a call. For a typical call, there is an "originating" basic call model (OBCM) 108 at the SSP 102 of the caller side 112 and a "terminating" basic call model (TBCM) at the SSP 102 of the callee side 114.

FIGS. 2a and 2b show graphical representations of the OBCM 108 and TBCM 110, respectively. The BCMs shown in the FIGS. 2a and 2b are standard for AIN Release 0.1. Each basic call model defines a set of "points in call" (PICs) which correspond to the important states in a call. Associated with each PIC is a set of "detection points" (DPs) which are used to detect an event during a call. A DP is associated with a set of "triggers" each of which specifies the conditions under which an AIN feature can be invoked.

AIN features are implemented by service logic programs residing on the SCP 104. Each AIN feature is associated with a set of triggers that specify at which PICs in the basic call model and under what conditions the feature can be invoked by the SSP 102 during a call. Typically, an AIN feature is invoked during a call if the following four conditions are satisfied: (1) the user has subscribed to this feature; (2) the user has activated this feature; (3) the call is at a PIC that the trigger of this feature is associated with; (4) the trigger condition is true. Note that even though an AIN feature, in general, can have more than one trigger, it can only be activated by one trigger at any instance during a call. In the following description, AIN features associated with a single trigger are considered, but the analysis extends to multiple triggers as well.

FIG. 3 shows a conceptual model of feature interaction in AIN Release 0.1. AIN is based on the SS7 Signaling Network Architecture, which is further described in Beninger, Toni, "SS7 Basics," Telephony Div. Intertec Publishing Corp. ISBN:0-917845-16-1. The SSP 102 communicates with the SCP 104 via TCAP messages 302. TCAP (Transaction Capabilities Application Part) is an SS7 application protocol which provides non-circuit related information transfer capabilities and generic services to applications, yet remains independent of the application. For feature interaction detection, the focus is on call-related TCAP messages 302, i.e., those that affect the processing of a call. Each TCAP message 302 carries a set of call variables (as TCAP parameters), which are used to exchange call-related information between an SSP 102 and an SCP 104. When an AIN feature 304 is invoked, the SSP 102 sends a query message with a set of call variable values to the SCP 104 to start the execution of the feature on the SCP 104. Upon the receipt of the query message, the SCP 104 executes the service logic program according to the type of message and the call variable values in the message. The SCP 104 then informs the SSP 102 of the next action to take by sending a response message back the SSP with a set of call variables whose values may have been generated or modified by the SCP. The SSP 102 uses these call variable values received in the response message to influence the call processing. There might be several rounds of message exchanges between the SSP 102 and the SCP 104 before the feature 304 is done. In summary, an invocation of an AIN feature 304 can be regarded as a transaction between an SSP 102 and an SCP 104, which starts with a query message from the SSP and involves a finite sequence of message exchanges between the SSP and the SCP. Switch-based features 306 are described below.

The execution of an AIN feature is atomic with respect to other AIN features, i.e., once an AIN feature is invoked, it cannot be interrupted by another AIN feature until it is finished. In AIN Release 0.1, the same holds true for AIN and switch-based features, an AIN feature cannot be interrupted by a switch-based feature and vice-versa.

It is possible for an AIN 0.1 feature to cause a modification in the control flow of the call model within which it is activated. Thus, it is possible that the AIN feature may start out at one PIC and terminate at another. In one embodiment consistent with the present invention, those features that terminate at the same PIC as the one at which they triggered are considered.

There are two major reasons why features interact with each other: "control sharing" and "data sharing". For control sharing, a set of features share the state information of the same basic call model, and consequently, the order of invocation among the features is very important. If one feature disconnects the call, then all the remaining features will not be able to execute. This is called "disabling."

For data sharing, features share the same set of call variables on a SSP 102 for call processing (see FIG. 3). Since the set of call variables carried in the TCAP messages 302 between the SSP 102 and the SCP 104 is essential to allow a feature 304 to influence call processing in the SSP, call variable values set or changed by one feature 304 might affect other features invoked later in the same basic call model that read and use these call variables. This is called a "side-effect."

Accordingly, it would be desirable to have a system that quickly and efficiently recognizes these problems and determines whether a feature package has potential interactions.

DESCRIPTION OF THE INVENTION

Methods and systems consistent with the present invention satisfy this and other desires by presenting an integrated methodology for specifying AIN and switch-based features and detecting their interactions when present within a feature package provided to a single subscriber, which can be used to support access to third party service providers' features for AIN Release 0.1.

Consistent with the present invention, a method is provided that models a call environment, models two or more features, and combines the call variable usage for each feature. The method then compares the combined call variable usages to detect potential feature interactions.

Methods and systems consistent with the present invention assist a service mediator in the tasks of detecting potential interactions among AIN features provided by different third party service providers, and detecting potential interactions between a third party service provider's AIN features and switch-based features. The service mediator performs these detections based on the minimum necessary feature information obtained from service providers. Once the providers make individual feature specifications available, each specification can be validated for consistency in terms of data and control, and interaction analysis can be conducted to reveal potential interactions. Two types of interactions are identified: (1) side-effects, where a call variable modified by one feature is used by another feature and (2) disabling, where one feature disconnects a call, preventing another feature from execution. The combining of the various call variable usages of each feature dramatically reduces the number of cases considered during the analysis.

The methodology has the advantage that each feature may be created without the knowledge of other features, and that each feature can be specified as a "black box," i.e., nothing is known about its internal logic except its input/output behaviors. Consequently, a service provider can create features within some pre-notified, well-defined constraints without being aware of other service providers' AIN features or a switch vendor's switch-based features. This advantage allows third-party service providers to reveal only non-intrusive, minimal amounts of information about their features to a service mediator. A by-product of the analysis is a set of interaction scenarios represented via message sequences for each interacting AIN feature. These scenarios give additional feedback to the user that aids in the process of resolving the detected interactions.

BRIEF DESCRIPTION OF THE DRAWINGS

FIG. 2a is a block diagram representing a prior art originating basic call model used in AIN Release 0.1 consistent with the present invention;

BEST MODE FOR CARRYING OUT THE INVENTION

Methods and systems consistent with the present invention generally concern two types of interactions among features operating whiting the same basic call model. disabling and side effects. The methods and systems can be applied to detect both types of feature interactions, and the detection is centered on usage analysis of the common set of call variables on the SSP 102 that are shared among the features. Since no knowledge of a feature's internal logic but its input/output behavior is assumed, the information from the TCAP messages 302 plays a central role in methods and systems consistent with the present invention for detecting both types of feature interactions.

Figure 4:
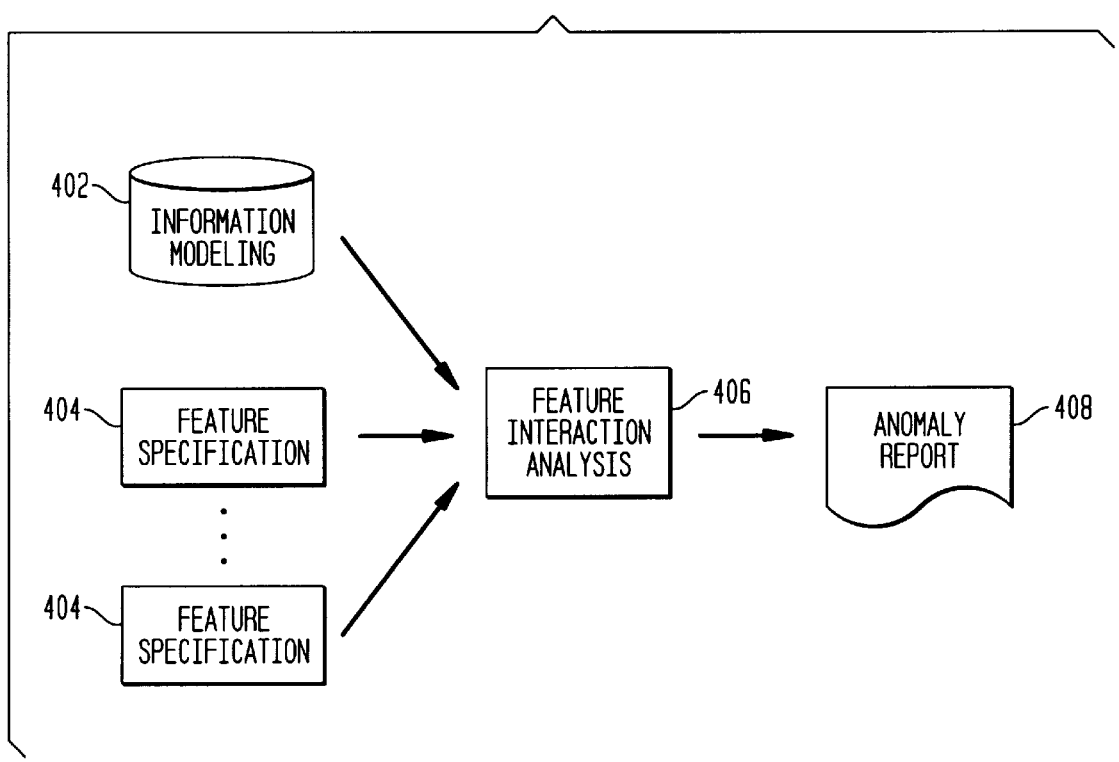
FIG. 4 is a block diagram illustrating an overview of feature interaction analysis consistent with the present invention.

FIG. 4 depicts a block diagram of a feature interaction methodology consistent with the present invention. It defines an input, a process, and an output. There are two sources of inputs: those from "information modeling" 402 and those from "feature specifications" 404.

Information modeling 402 means encoding and organizing the feature execution environment in a machine manipulable form, which includes the basic call models (108 and 110), the call-related TCAP messages 302, the set of call variables exchanged between an SSP 102 and an SCP 104, and the interrelations among them.

Feature specifications 404 are the minimum required feature information from the service providers. They are described in both data specification and control specification. The former defines how a feature manipulates the data within the scope of its control. The latter defines the TCAP message control sequences between the SCP 104 and the SSP 102 for a feature.

The "feature interaction analysis" process 406 takes the inputs defined above and carries out the reasoning required to detect any potential interactions among input features.

The output is any "anomalies" 408 (i.e., potential interactions) discovered by the feature interaction analysis process 406. This information is decoded and presented to users in an easily readable format.

Information modeling 402, feature specification 404 and feature interaction analysis 406 are described in detail below in sections 1, 2 and 3. Section 1 discusses information modeling in detail. Section 2 elaborates on feature specifications needed to make use of methods and systems consistent with the present invention. Section 3 addresses feature interaction detection and optimizations used for the analysis.

System Description

Figure 5:
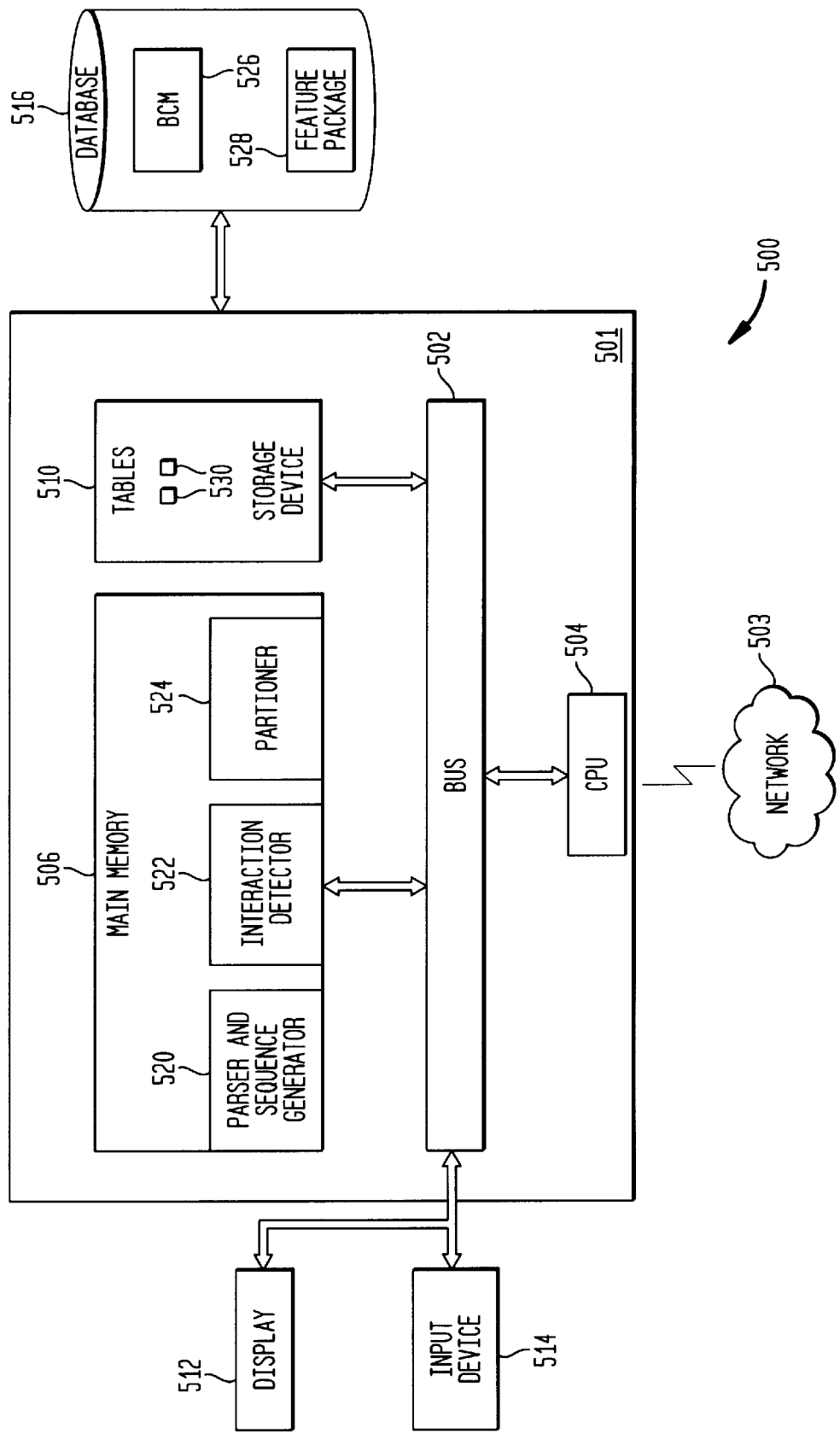
FIG. 5 is a block diagram illustrating a computer system suitable for execution of methods consistent with the present invention.

FIG. 5 is a block diagram of a data processing system 500 suitable for executing methods consistent with the present invention. The data processing system 500 comprises a computer system 501, which may for example, be connected to a network 503, such as the Internet. The computer system 501 includes a central processing unit (CPU) 504, a main memory 506, and a secondary storage device 510 interconnected via bus 502. This secondary storage device may be a hard drive, for example. Additionally, the computer system 500 includes a display 512 and an input device 514. Main memory 506 contains software code for implementing methods consistent with the present invention. The data processing system 500 also comprises a database 516. This database 516 may be external to the computer system 501, or may be contained on the computer system 501, for example, in the main memory 506. The relational database tables 530 described herein may be stored in the main memory 506 or the database 516, and manipulations of these tables may be performed by CPU 504.

As described in detail below, this main memory 506 contains a parser and sequence generator 520, a partitioner 524, and an interaction detector 522. Also described below, the database 516 is used to store persistent data and may contain data including a basic call model 526, a library of feature specifications 528 and library of packages comprised of some combinations of these features.

Those skilled in the art will appreciate that aspects of methods and systems consistent with the present invention may be stored on or read from any other computer readable media besides memory like secondary storage devices, such as hard disks, floppy disks, and CD-ROM, or a carrier wave from a network 503, such as the Internet. Additionally, those skilled in the art will appreciate that data processing system 500 may contain additional or different components, and that processes implemented by software may also be implemented by hardware components.

1. Information Modeling

As shown in FIG. 5, information modeling is realized by a relational database 516 consisting of a collection of tables. Each row in a table is a data record comprising several attributes. Such a database 516 is built to serve several purposes. It ties the AIN basic call models (108 and 110) with the TCAP messages 302. It also defines the properties of the call variables (i.e., parameters) carried by each TCAP message 302 and defines the properties of each TCAP message. Furthermore, the database 516 is used for defining the allowable TCAP message sequences between an SSP 102 and an SCP 104, and defining the precedence relations between DPs occurring at the various PICs in each of the BCMs. The rest of the section will address each of these issues in detail. Note that not all the information about AIN is modeled. Only abstract information needed for the purpose of feature interaction analysis is modeled.

1.1. Tying AIN Basic Call Models with TCAP Messages

Three tables 1(a), (b) and (c), (PIC, DP, and TRIGGER) are created to encode the information that ties the AIN basic call models with the TCAP messages 302. The PIC table associates each PIC with all of its DP's. The DP table associates each DP with all of its triggers. The TRIGGER table then associates each trigger with a TCAP query message sent to SCP. In each table, information about the OBCM 108 and the TBCM 110 are separated by a bold horizontal line.

TABLE 1(a)

| PIC | |
|---|---|
| PIC | DP |
| O_NULL | Origination_Attempt |
| COLLECT_INFORMATION | Info_Collected |
| ANALYZE_INFORMATION | Info_Analyzed |
| SELECT_ROUTE | Network_Busy |
| T_NULL | Termination_Attempt |

TABLE 1(b)

| DP | |
|---|---|
| DP | TRIGGERS |
| Origination_Attempt | Off-Hook Immediate |
| Info_Collected | Off-Hook Delay |
| | Channel Setup PRI |
| | Shared Interoffice Trunk |

TABLE 1(b)-continued

| DP | | 
|---|---|
| DP | TRIGGERS |
| Info_Analyzed | BRI Feature Activation Indicator |
| | Public Office Dialing Plan Feature Code |
| | Customized Dialing Plan |
| | 3/6/10 Digit Public Office Dialing Plan |
| | N11 |
| Network_Busy | AFR |
| Termination_Attempt | Termination Attempt |

TABLE 1(c)

| TRIGGER | |
|---|---|
| TRIGGER | MESSAGE |
| Off-Hook Immediate | Origination_Attempt |
| Off-Hood Delay | Info_Collected |
| Channel Setup PRI | Info_Collected |
| Shared Interoffice Trunk | Info_Collected |
| BRI Feature Activation Indicator | Info_Analyzed |
| Public Office Dialing Plan Feature Code | Info_Analyzed |
| Customized Dialing Plan | Info_Analyzed |
| 3/6/10 Digit Public Office Dialing Plan | Info_Analyzed |
| N11 | Info_Analyzed |
| AFR | Network_Busy |
| Termination Attempt | Termination_Attempt |

Implicit in Table 1(a) is the "precedence" relation among PIC's in a BCM. For OBCM 108, the linear ordering is from O_NULL to SELECT_ROUTE. For example PIC ANALYZE_INFORMATION occurs after PIC O_NULL but before PIC SELECT_ROUTE. Similarly, the linear ordering from top to bottom in the "trigger" column of Table 1(b) also implies the precedence relation among triggers in a BCM. So trigger Customized_Dialing_Plan has higher priority over trigger N11, even though they are associated with the same DP, Info_Analyzed.

1.2. Defining the Properties and Call Variables of Each TCAP Message

A table message is created to encode the important data of TCAP messages 302. The attributes of this table include, (1) the name of a message, (2) the sender of a message (SSP 102 or SCP 104 or both), (3) the TCAP package type of a message, (4) the TCAP component type of a message, (5) the call variables carried by a message, (6) which BCM sends/receives this message (OBCM, TBCM, or both), and (7) the type of a message (call-related, non-call-related, or abnormal message).

Table 2 lists a sample record of a message table. (Note that the attributes in Table 2 are listed by row rather than by column.)

TABLE 2

| A Sample Record in table message | |
|---|---|
| Message Name | Analyze_Route |
| Sender | SCP |
| Package Type | RES |
| Component Type | INV |
| Message Call variables | ChargeNumber, CallingPartyID, ChargePartyStationType, CalledPartyID, OutpulseNumber, Tcm, PrimaryTrunk Group, |

TABLE 2-continued

| A Sample Record in table message | |
|---|---|
| | AlternateTrunkGroup, |
| | SecondAlternateTrunkGroup, |
| | PrimaryCarrier, AlternateCarrier, |
| | SecondAlternateCarrier, |
| | PassiveLegTreatment, RedirectingPartyID |
| | PrimaryBillingIndicator, |
| | AlternateBillingIndicator, |
| | SecondAlternateBillingIndicator, |
| | OverflowBillingIndicator, |
| | AMAAlternateBillingNumber, |
| | AMABusinessCustomerID, AMALine Number, |
| | AMADigitsDialedWC, Amp |
| BCM | O |
| Type | CL |

Each TCAP message 302 deals with only a subset of call variables. Each call variable in a message is either mandatory, meaning that the message must carry a value for this call variable, or optional, in which case the message may or may not carry a value for the call variable. This information is further specified in the parameter table in the following subsection.

For the purpose of feature interaction detection, call-related messages are primarily analyzed. However, one or more non-call-related message components can be packaged with a response message and sent back from the SCP 104 to the SSP 102. So the set of messages modeled are all call-related messages and a subset of non-call-related messages that can be sent back from the SCP 104 with the call-related messages.

1.3. Defining the Properties of Each TCAP Message Call Variable

A table parameter is created to encode the important data of TCAP message call variables. This table is so named because the call variables are carried as TCAP parameters from the SSP 102 to the SCP 104 and back. The attributes of this table include: (1) the PIC from which the data of a call variable becomes available, (2) the data transfer direction of a call variable (from SSP 102 to SCP 104 or from SCP to SSP), (3) in which message and in what format a call variable is presented.

Table 3 lists two sample records of a parameter table, which concern call variables BearerCapability and CalledPartyID, respectively.

TABLE 3

| Sample Records in Table parameter | | |
|---|---|---|
| Call variable | Bearer-Capability | CalledPartyID |
| Obcm_pic | O_NULL | ANALYZE_INFORMATION |
| Tbcm_pic | T_NULL | T_NULL |
| Ssp | X | X |
| SCP | X | X |
| Termination_Notification# | | |
| Info_Analyzed! | M | O |
| Info_Collected! | M | |
| Network_Busy! | M | O |
| Origination_Attempt! | M | |
| Termination_Attempt! | M | O |
| Analyze_Route# | | O |
| Authorize_Termination # | | |
| Continue # | | |
| Disconnect # | | |
| Forward_Call # | | O |

TABLE 3-continued

Sample Records in Table parameter

| Call variable | Bearer-Capability | CalledPartyID |
|---|---|---|
| Send_To_Resource # | | |
| ACG# | | |
| Send_Notification | | |
| Resource_Clear | | |
| Update_Data | | |
| Send_To_Resource | | |
| Update_Request | O | |
| ACG | | |
| Cancel_Resource_Event | | |
| Update_Data# | | |
| Resource_Clear # | | |

The second column in table 3 specifies the characteristics of parameter BearerCapability: (1) the data becomes available from PIC O_NULL in the OBCM 108 and from PIC T_NULL in the TBCM 110; (2) it can be sent from SSP 102 SCP 104 or vice versa; (3) in messages Info_Analyzed and Info_Collected, BearerCapability is a mandatory call variable (marked as "M"), but in message Update_Request it is an optional call variable (marked as "O").

1.4. Define the Allowable TCAP Message Sequences between the SSP and the SCP

A rule-based specification (also in table format) is used to encode all the able TCAP message sequences between the SSP 102 and the SCP 104 (see Table 4). This table contains the message exchange rules when an OBCM 108 or a TBCM 110 on the SSP 102 interacts with the service logic of a feature on the SCP 104.

TABLE 4

Rule-Based Specification of SSP-SCP TCAP Message Sequences

| Rule | BCM | Last_Message_Exchanged | Next_Message_Exchanged |
|---|---|---|---|
| 1 | O | Origination_Attempt! | Analyze_Route# [Send_Notification[ACG*], Disconnect# [Send_Notification \|ACG*], <suspend>Send_To_Resource* [ACG*\|Update_Request] |
| 2 | O | Info_Collected! | Analyze_Route# [Send_Notification\|ACG*], Disconnect# [Send_Notification\|ACG*], <suspend>Send_To_Resource* [ACG*\|Update_Request] |
| 3 | O | Info_Analyzed! | Analyze_Route# [Send_Notification\|ACG*], Continue# [Send_Notification\|ACG*], Disconnect# [Send_Notification\|ACG*], <suspend>Send_To_Resource* [ACG*\|Update_Request] |
| 4 | O | Network_Busy! | Analyze_Route# [Send_Notification\|ACG*], Disconnected# [Send_Notification\|ACG*], <suspend>Send_To_Resource* [ACG*\|Update Request] |
| 5 | T | Termination_Attempt! | Authorize_Termination# [Send_Notification\|ACG*], Forward_Call# [Send_Notification\|ACG*], Disconnect# [Send_Notification\|ACG*], <suspend>Send_To_Resource* [ACG*\|Update_Request] |

TABLE 4-continued

Rule-Based Specification of SSP-SCP TCAP Message Sequences

| Rule | BCM | Last_Message_Exchanged | Next_Message_Exchanged |
|---|---|---|---|
| 6 | O,T | Send_Notification | Termination_Notification# |
| 7 | O,T | ACG | GapDuration_Timeout |
| 8 | O,T | Update_Request | Update_Data*, Honored_RR# |
| 9 | O,T | Send_To_Resource | Resource_Clear*,Cancel_Resource_Event |
| 10 | O,T | Cancel_Resource_Event | Resource_Clear* |
| 11 | O,T | Resource_Clear | <resume> |
| 12 | O,T | Update_Data | # |
| 13 | O,T | GapDuration_Timeout | # |

There are two attributes in a rule: Last_Message_Exchanged and Next_Message_Exchanged. Their syntactic constructs and semantic meanings are described below.

Each message uses a single symbol suffix to indicate its package type in the following way: (1) The query messages are suffixed with an exclamation mark ("?"). (2). The response and unidirectional messages are suffixed with a pound sign ("#"), except for Send_Notification. Send_Notification is treated as if it were a conversation message because it requires a unidirectional message, Termination_Notification, as its response. (3) The conversation messages have no suffix.

Last_Message_Exchanged specifies a single message that is last exchanged between an SSP 102 and an SCP 104. This attribute is used to enable a rule. The message specified follows the preceding suffixing rules with one exception: the suffix "#" (i.e., response and unidirectional message) is prohibited. Next_Message_Exchanged is a list of messages separated by comma (","). It specifies all the possible next messages that can be exchanged between an SSP 102 an SCP 104. The messages specified also follow the preceding suffixing rules with two exceptions: (1) The suffix "?" (i.e., a query message) is prohibited. (2) A with suffix "*" (asterisk) is allowed. This suffix is a shorthand notation for pressing a message that can be exchanged either as a conversion message or as a response/unidirectional message. For instance, the Next_Message_Exchanged in Rule 9 is Resource_Clear*, which is a shorthand notation for Resource_Clear#, Resource_Clear.

A message specified in Next_Message_Exchanged can be a multiple-component TCAP message. In this case, it will be expressed as a call-related component followed by one or two non-call-related components enclosed within a pair of square brackets. Those noncall-related messages are separated by a vertical bar "|" to indicate the possibility of any arbitrary combination of those components. For instance, one of the messages in the Next_Message_Exchanged of Rule 1 is Analyze_Route#[Send_Notification|ACG*], which represents any one of the following six possible formats:

1. a three-component message
   Analyze_Route#[Send_Notification|ACG], or
2. a three-component message
   Analyze_Route#[Send_Notification|ACG#], or
3. a two-component message Analyze_Route# [SendNotification], or
4. a two-component message Analyze_Route#[ACG], or
5. a two-component message Analyze_Route#[ACG#], or
6. a single-component message Analyze_Route#.

Two special operators <suspend> and <resume> can also appear in the Next_Message_Exchanged. <suspend> is prefixed to the conversation message Send_To_Resource, <resume> follows Resource_Clear. The <suspend> is used to set a backtracking point for executing rules. The <resume> is used to resume the rule execution from the backtracking point. A single pound sign ("#") implies the end of the message exchange.

1.5. Defining Precedence Relations Between DPs

Figure 1:
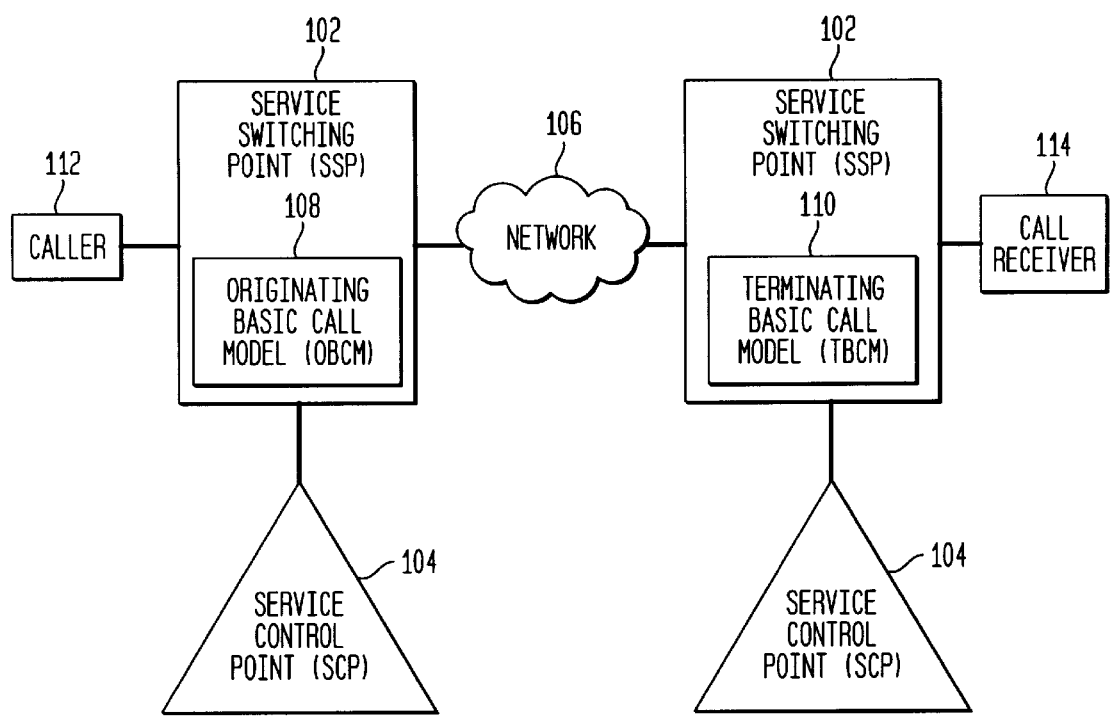
FIG. 1 is a block diagram representing an exemplary prior art call processing network with service switching points and service control points consistent with the present invention.
Figure 2B:
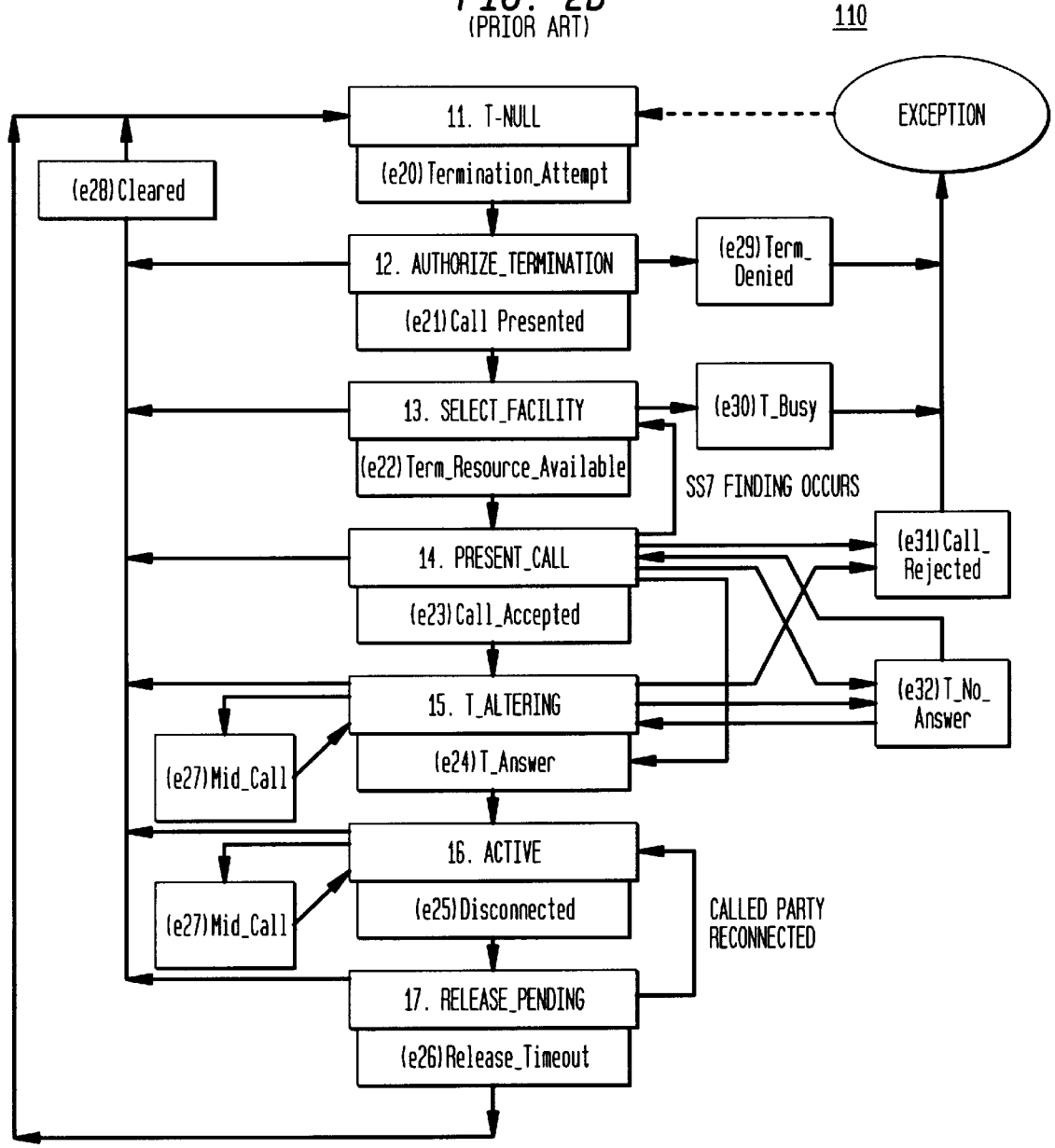
FIG. 2b is a block diagram representing a prior art terminating basic call model used in AIN Release 0.1 consistent with the present invention.

The OBCM 108 and TBCM 110 as shown in FIGS. 2a and 2b can be used to define a precedence relationship between DPs at the various PICs in each of the call models. Two tables listed as Table 5 (tbcm 110) and Table 6 (obcm 108) are created to define partial orderings of the DPs at the TBCM and OBCM, respectively. Each entry in each column of these tables is a DP-PIC pair representing a DP and the PIC at which it occurs. The first and second columns in these tables represent preceding and succeeding DP-PIC pairs respectively, within the associated BCM. Thus, Feature_Requested(O_NULL) precedes Origination_Attempt(O_NULL) in the OBCM 108. The relations obtained by computing the transitive closures of each of these tables define precedence relations on DP-PIC pairs in each of the BCMs. These precedence relations are useful for detecting feature interactions between AIN and switch-based features (as will be seen in section 3.4.1). Note that the precedence relation between triggers as described in section 1.1 is not sufficient because switch-based features are not associated with AIN triggers.

TABLE 5 tbcm

| Preceding DP-PIC pair | Succeeding DP-PIC pair |
|---|---|
| Termination_Attempt (T_NULL) | Call_Presented (AUTHORIZE_TERMINATION) |
| | Termination_Denied (AUTHORIZE_TERMINATION) |
| | Cleared (AUTHORIZE_TERMINATION) |
| Call_Presented (AUTHORIZE_TERMINATION) | Term_Resource_Available (SELECT_FACILITY) |
| | T_Busy (SELECT_FACILITY) |
| | Cleared (SELECT_FACILITY) |
| Team_Resource_Available (SELECT_FACILITY) | Call_Accepted (PRESENT_CALL) |
| | Call_Rejected (PRESENT_CALL) |
| | T_No_Answer (PRESENT_CALL) |
| | Cleared (PRESENT_CALL) |
| Call_Accepted (PRESENT_CALL) | T_Answer (T_ALERTING) |
| | Call_Rejected (T_ALERTING) |
| | Mid_Call (T_ALERTING) |
| | T_No_Answer (T_ALERTING) |
| | Cleared (T_ALERTING) |
| Mid_Call (T_ALERTING) | T_Answer (T_ALERTING) |
| | Call_Rejected (T_ALERTING) |
| | T_No_Answer (T_ALERTING) |
| | Cleared (T_ALERTING) |
| T_Answer (T_ALERTING) | Disconnected (ACTIVE) |
| | Mid_Call (ACTIVE) |
| | Cleared (ACTIVE) |
| Mid_Call (ACTIVE) | Disconnected (ACTIVE) |
| | Cleared (ACTIVE) |
| Disconnected (ACTIVE) | Release_Timeout (RELEASE_PENDING) |
| | Cleared (RELEASE_PENDING) |

TABLE 6 obcm

| Preceding DP-PIC pair | Succeeding DP-PIC pair |
|---|---|
| Feature_Requested (O_NULL) | Origination_Attempt (O_NULL) |
| Origination_Attempt (O_NULL) | Origination_Attempt_Authorized (AUTHORIZE_ORIG_ATTEMPT) |
| | Origination_Denied (AUTHORIZE_ORIG_ATTEMPT) |
| | Disconnected (AUTHORIZE_ORIG_ATTEMPT) |
| Origination_Attempt_Authorized (AUTHORIZE_ORIG_ATTEMPT) | Info_Collected (COLLECT_INFORMATION) |
| | Collect_Timeout (COLLECT_INFORMATION) |
| | Disconnected (COLLECT_INFORMATION) |
| | Feature_Requested (COLLECT_INFORMATION) |
| Feature_Requested (COLLECT_INFORMATION) | Info_Collected (COLLECT_INFORMATION) |
| | Collect_Timeout (COLLECT_INFORMATION) |
| | Disconnected (COLLECT_INFORMATION) |
| Info_Collected (COLLECT_INFORMATION) | Info_Analyzed (ANALYZE_INFORMATION) |
| | Invalid_Information (ANALYZE_INFORMATION) |
| | Disconnected (ANALYZE_INFORMATION) |
| | Feature_Requested (ANALYZE_INFORMATION) |
| Feature_Requested (ANALYZE_INFORMATION) | Info_Analyzed (ANALYZE_INFORMATION) |
| | Invalid_Information (ANALYZE_INFORMATION) |
| | Disconnected (ANALYZE_INFORMATION) |

TABLE 6-continued obcm

| Preceding DP-PIC pair | Succeeding DP-PIC pair |
|---|---|
| Info_Analyzed (ANALYZE_INFORMATION) | Route_Selected (SELECT_ROUTE) Network_Busy (SELECT_ROUTE) Disconnected (SELECT_ROUTE) Feature_Requested (SELECT_ROUTE) |
| Feature_Requested (SELECTED_ROUTE) | Route_Selected (SELECT_ROUTE) Network_Busy (SELECT_ROUTE) Disconnected (SELECT_ROUTE) |
| Route_Selected (SELECT_ROUTE) | Call_Setup_Authorized (AUTHORIZE_CALL_SETUP) Authorization_Failure (AUTHORIZE_CALL_SETUP) Disconnected (AUTHORIZE_CALL_SETUP) Feature_Requested (AUTHORIZE_CALL_SETUP) |
| Feature_Requested (AUTHORIZE_CALL_SETUP | Call_Setup_Authorized (AUTHORIZE_CALL_SETUP) Authorization_Failure (AUTHORIZE_CALL_SETUP) Disconnected (AUTHORIZE_CALL_SETUP) |
| Call_Setup_Authorized (AUTHORIZED_CALL_SETUP) | O_Term_Seized (SEND_CALL) Mid_Call (SEND_CALL) Disconnected (SEND_CALL) O_Called_Party_Busy (SEND_CALL) O_No_Answer (SEND_CALL) |
| Mid_Call (SEND_CALL) | O_Term_Seized (SEND_CALL) Disconnected (SEND_CALL) O_Called_Party_Busy (SEND_CALL) O_No_Answer (SEND_CALL) |
| O_Term_Seized (SEND_CALL) | O_Answer (O_ALERTING) Mid_Call (O_ALERTING) Disconnected (O_ALERTING) O_Called_Party_Busy (O_ALERTING) O_No_Answer (O_ALERTING) |
| Mid_Call (O_ALERTING) | O_Answering (O_ALERTING) O_Called_Party_Busy (O_ALERTING) O_No_Answer (O_ALERTING) Disconnected (O_ALERTING) |
| O_Answer (O_ALERTING) | Cleared (ACTIVE) Mid_Call (ACTIVE) Disconnected (ACTIVE) |
| Mid_Call (ACTIVE) | Cleared (ACTIVE) Disconnected (ACTIVE) |
| Cleared (ACTIVE) | Release_Timeout (RELEASE_PENDING) Mid_Call (RELEASE_PENDING) Disconnected (RELEASE_PENDING) |
| Mid_Call (RELEASE_PENDING) | Release_Timeout (RELEASE_PENDING) Disconnected (RELEASE_PENDING) |

2. Feature Modeling and Specification

This section discusses the feature information used by methods and systems consistent with the present invention to run the feature interaction analysis. Referring back to FIG. 4, an exemplary business scenario may be that specifications of AIN features 404 are submitted to the service mediator by third-party service providers, and the specifications of switch-based features are made available directly by the service mediators for the feature interaction analysis 406.

2.1. AIN Feature Specification

Each AIN feature is modeled via two pieces of information: control specification and data specification. The control specification is a rule-based specification that specifies how the feature interacts with the SSP 102 via TCAP messages 302. The data specification is a data usage description that specifies how the call variables in each TCAP message 302 are manipulated by the feature. Details of these specifications are provided in sections 2.1.2 and 2.1.3.

2.1.1. An Illustrative AIN 0.1 Feature

Throughout this section, an AIN 0.1 feature, called NPA-NXX screening, is used as an example to illustrate the process of AIN feature specification. NPA-NXX screening is a feature that allows subscribers to screen outgoing calls from their lines. With this feature, screening can be applied to local calls or long distance calls. The subscribers can define screening lists to prevent calls to certain classes of numbers (fort example to a certain calling area, toll based service lines like 900 numbers or 976 numbers or even to a specific number).

2.1.2. Control Specification (AIN feature)

The control specification of a feature is a set of rules that describes all the possible TCAP message sequences between an SSP 109 and an SCP 104 for a feature. This specification turns out to be a subset of the rule-based specification defined in Section 1.4 (Table 4).

In fact, given the AIN trigger for a feature, one can find the corresponding SSP query message that starts the feature via one or more lookups in the tables defined in the previous section. Using this SSP query message as a starting point, one can select the set of all the message exchange rules from Table 4. The resulting set of rules forms the control specification for that feature.

Table 7 lists the control specification for NPA-NXX screening. Each rule in the control specification lists a message and its possible successor in a sequence of message exchanges between an SSP 102 and an SCP 104 as a result of this feature being triggered. Thus, when the feature is triggered (at trigger Customized Dialing Plan), an Info_Analyzed! query message from the SSP 102 could result in either of Analyze_Route#, Disconnect#, Continue# or Send_To_Resource being sent in response, by the SCP 104.

TABLE 7

Control Specification for NPA-NXX Screening

| Rule | Last_Message_Exchanged | Next_Message_Exchanged |
|---|---|---|
| 1 | Info_Analyzed! | Analyze_Route# [Send_Notification\|ACG*], Disconnect# [Send_Notification\|ACG*], Continue# [Send_Notification\|ACG*], <suspend>Send_To_Resource* [ACG*\|Update_Request] |
| 2 | Send_Notification | Termination_Notification# |
| 3 | ACG | GapDuration_Timeout |
| 4 | Update_Request | Update_Data*, Honored_RR# |
| 5 | Send_To_Resource | Resource_Clear*, Cancel_Resource_Event |
| 6 | Cancel_Resource_Event | Resource_Clear* |
| 7 | Resource_Clear | <resume> |
| 8 | Update_Data | # |
| 9 | GapDuration_Timeout | # |

2.1.3. Data Specification (AIN feature)

The data specification of a feature specifies the usage of each call variable in every TCAP message 302 used by this feature. This specification process is called "population" of the call variables in a message. Currently, the following notations have been defined to mark the usage of each call variable.

Call variables that come into the SCP 104, are marked as:

"R" if they are call variables sent by SSP 102 to be Read and used by the feature:

"N" if they are call variables sent by SSP 102 but Not to be read and used;

"X" if they are optional call variables that won't get populated for this feature.

Call variables that leave from SCP 104, are marked as:

"G" if they are not call variables from SSP 102 but Generated by SCP 104;

"U" if they are call variables received from SSP 102 and now sent back by SCP 104 to Update the call processing variables in SSP;

"H" if they are call variables received from SSP 102 and now sent back to SSP 102 unchanged;

"X" if they are optional call variables that won't get populated for this feature.

Note that only mandatory and optional call variables (as described in section 1.3) need to be populated in a data specification. In particular, population of all mandatory call variables of a message is required, i.e., they cannot be marked as "X" in a data specification. Table 8 shows a part of the data specification for the message sequences initiated by the Info_Analyzed message of the NPA-NXX screening feature. For the sake of space, only the populated call variables are shown in the table 8.

TABLE 8

Partial Data Specification for NPA-NXX

| Call Variable | ACG | ACG # | Analyze Route # | Cancel Resource Event | Continue # | Disconnect # | Info Analyzed! | Resource Clear | Resource Clear # | Send Notification | Send To Resource | Send To Resource # | Termination Notification | Update Data | Update Data # | Update Request |
|---|---|---|---|---|---|---|---|---|---|---|---|---|---|---|---|---|
| ACGEncountered | | | | | | | | | | | | | | | | |
| AMAAlternateBillingNumber | | | G | G | G | | N | | | X | X | | | | | |
| AMABusinessCustomerID | | | G | G | G | | | | | X | G | G | | | | |
| AMADigitsDialedWC | | | G | G | G | | | | | X | G | | | | | |
| AMALineNumber | | | G | G | G | | | | | X | G | | | | | |
| AMAsIpID | | | | | | | | | | | | | | | | |
| AccessCode | | | | | | | N | | | | | | | | | |
| AlternateBillingIndicator | | | G | | | | | | | | | | | | | |
| AnswerIndicator | | | | | | | | | | | G | G | | | | |
| ApplicationErrorstring | | | | | | | | | | | | | | | | |
| BearerCapability | | | | | | | N | | | | | | | | | |
| BusyCause | | | | | | | | | | | | | R | | | X |
| CalledPartyID | | | H | | | | R | | | | | | | | | |
| CalledPartyBGID | | | | | | | R | | | | | | | | | |
| CallingPartyID | | | H | H | | | R | | | | | | | | | |
| ChargeNumber | | | X | | | | N | | | | | | | | | |
| ChargePartyStationType | | | X | | | | N | | | | | | | | | |
| ClearCause | | | | | | | | R | R | | | | | | | |
| CollectedAddressInfo | | | | | | | X | R | X | | | | | | | |
| CollectedDigits | | | | | | | X | R | X | | | | | | | |
| ConnectTime | | | | | | | | | | | | | R | | | |
| ControlCauseIndicator | G | G | | | | | | | | | | | | | | |
| DestinationAddress | | | | | | | | | | | | X | | | | |
| DisconnectFlag | | | | | | | | | | | G | G | | | | |
| EchoData | | | | | | | | R | | | | | | | | |
| FailureCause | | | | | | | | | | | | | R | | | |
| GapDuration | G | G | | | | | | | | | | | | | | |
| GapInterval | G | G | | | | | | | | | | | | | | |
| GlobalTitleValue | G | G | | | | | | | | | | | | | | |
| Lata | | | | | | | R | | | | | | | | | |
| OriginalCalledPartyID | | | | | | | N | | | | | | | | | |
| PrimaryBillingIndicator | | | G | | | G | | | | | | | | | | |
| ResourceType | | | | | | | | | | | X | | | | | |
| StrParameterBlock | | | | | | | | | | | G | G | | | | |
| TerminationIndicator | | | | | | | | | | | G | G | | | | |
| TranslationType | | | | | | | | | | | | | | | | |
| TriggerCriteriaType | | | | | | | R | | | | | | | | | |
| UserID | G | G | | | | | R | | | | | | R | R | R | H |

2.2. Switch-based Feature Specification

Figure 3:
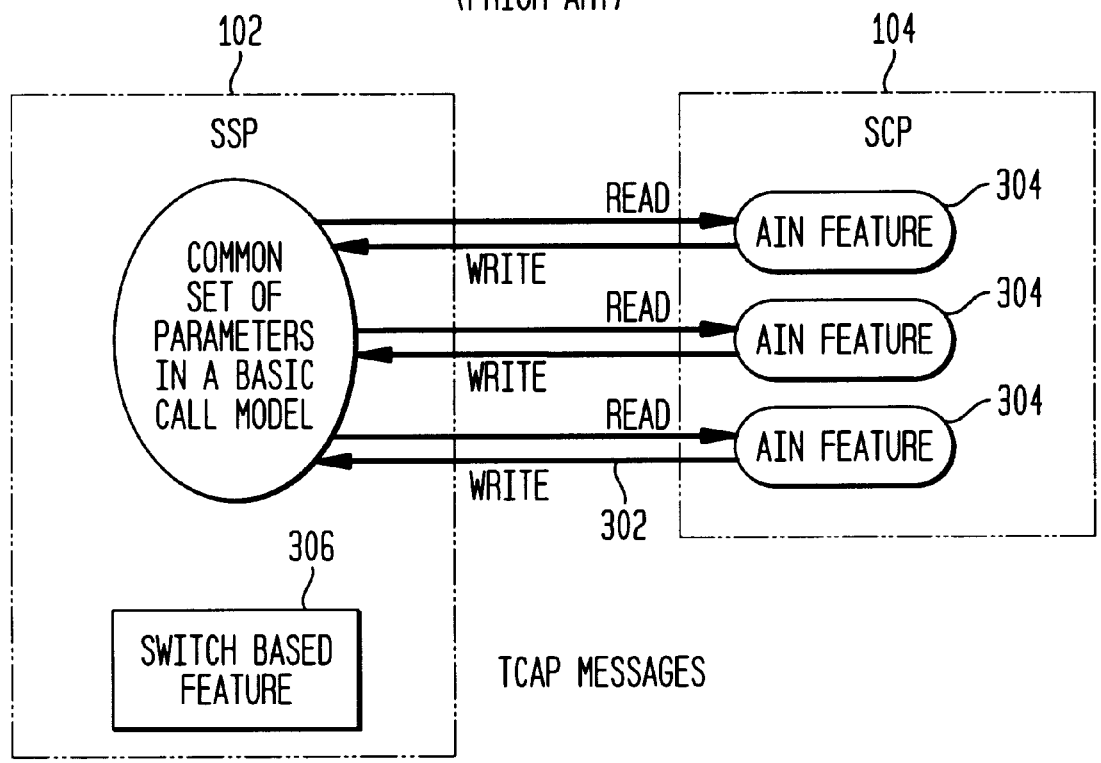
FIG. 3 is a block diagram depicting prior art feature interaction in AIN Release 0.1 consistent with the present invention.

Referring back to FIG. 3, a switch-based feature 306 is also modeled by data and control specifications. The control specification of a switch-based feature 306 specifies in what BCMs and at which DPs of each BCM the feature can influence call processing. The data specification then details the data (call variable) manipulation of the switch-based feature 306 at each "control" point. A switch-based feature 306 modifying data that could affect the values of TCAP call variables that are sent to the SCP 104 when an AIN feature 302 is triggered after the switch-based feature 306 terminates. A switch-based feature 306 can also be affected by values transferred to the SSP 102 from the SCP 104 via TCAP messages 302 as a result of a preceding AIN feature's execution. As stated, AIN 0.1 features 304 and switch-based features 306 are mutually atomic: an AIN feature may not execute while a switch-based feature is executing and vice versa. In addition, a switch-based feature 306 can be triggered at multiple detection points, and the effect that a switch based feature 306 can have on call variables (and vice versa) can differ at each of these points. This is reflected in the data specification as described below.

nating 108) instances for different legs of the same call. In the case of CFV, it is possible for the feature to be active on a TBCM 110 instance for one leg of a call and on an OBCM 108 instance for another leg of the same call. The feature could be active at a number of DPs in each of the BCM instances, and a given DP can be available at more than one PIC. Thus, the switch-based feature's specification has an entry for the call variable usage for each DP at each PIC present within each BCM instance on which the feature operates. In Table 9, the first column lists the instance number for the BCM instance in question, the second lists the BCM type (Originating 108 or Terminating 110) for this BCM instance, the third is the name of the DP at which this feature can operate along with a list of PICs (in parentheses) at which this DP may be encountered for this BCM instance. The rest of the columns give the call variable usage of this feature at this DP for three call variables: ACGEncountered, AMAAlternateBillingNumber and AMABusinessCustomerID. The rest of the call variables are not shown due to space constraints.

TABLE 9

Part of Data and Control Specification for CFV.

| Instance | BC M | Detection Points (DPs) and the Points in Call (PICs) at which they occur. | ACG-Encountered | AMA-Alternate-BillingNumber | AMABusiness-CustomerID |
|---|---|---|---|---|---|
| 1 | T | Termination_Attempt | N | W | W |
| 1 | T | T-Cleared (AUTHORIZE_TERMINATION/SELECT_FACILITY/PRESENT_CALL/T_ALERTING/T_ACTIVE/T_RELEASE_PENDING) | N | N | N |
| 2 | O | Origination_Attempt_Authorized | N | W | W |
| 2 | O | Origination_Denied | N | N | N |
| 2 | O | Invalid_Information | N | N | N |
| 2 | O | Network_Busy | N | N | N |
| 2 | O | Authorization_Failure | N | N | N |
| 2 | O | O_Called_Party_Busy (O_ALERTING) | N | N | N |
| 2 | O | O_No_Answer (O_ALERTING) | N | N | N |
| 2 | O | O_Release_Timeout | N | N | N |

2.2.1. An Illustrative Switch-based Feature

Call Forwarding Variable (CFV) is a calling feature that allows a user to redirect calls from one line to another. CFV is described in further detail in Bellcore, "Call Forwarding Variable", Technical Reference TR-TSY-000580, Issue 1, October 1989. CFV is controlled via an activation and deactivation procedure. The activation procedure has the capability to let the customer specify a Directory Number for the remote line to which calls should be forwarded. When a subscriber of the call forwarding feature receives a call, a special ring is used at the subscriber's line (if the line is idle) to indicate that a call has been received and forwarded. Calls cannot be answered at the subscriber's line while CFV is active, but calls can be originated from there. CFV is a feature that can occur at multiple DPs and can influence multiple legs of a call in the AIN 0.1 call model.

2.2.2. Data and Control Specification of a Switch-based Feature

Although data manipulation and control flow are distinct aspects of a switched-based feature, they are specified in one integrated table. Table 9 shows a part of the combined data and control specification for CFV. A switch-based feature can operate on different BCM (Terminating 110 or Origi- The call variable usage columns can contain one of four possibilities. A "READ" ("R") implies that the switch-based feature reads the call variable value, a "WRITE" ("W") specifies that the call variable value is written to by the feature, a "READ/WRITE" ("R/W") indicates that the call variable value can be processed in both ways. A value of "READ/WRITE" implies that the switch-based feature could perform both operations on the associated call variable. Since a switch-based feature is a black box, the ordering of the operations is not necessarily available, and it is assumed that either order is possible. The fourth alternative is that the call variable value is "NOT USED" ("N") at this DP.

For analysis of the features, a "signature" of a switch-based feature is defined. A switch-based feature is a set of tuples of the kind $(D, P, \mu, \phi)$, where "ID" and "P" are the DP and the PIC respectively at which the usage pattern "u" occurs for this switch-based feature for BCM instance "$\phi$". Each such tuple is called a signature of the instance "$\phi$'s" detection point "D" at PIC "P" for this switch-based feature.

3. Analysis Methods and Optimizations

This section discusses the analysis methods used to deal with feature interactions consistent with the present invention. Optimizations that can be used to speed up the detection process are described.

Figure 6:
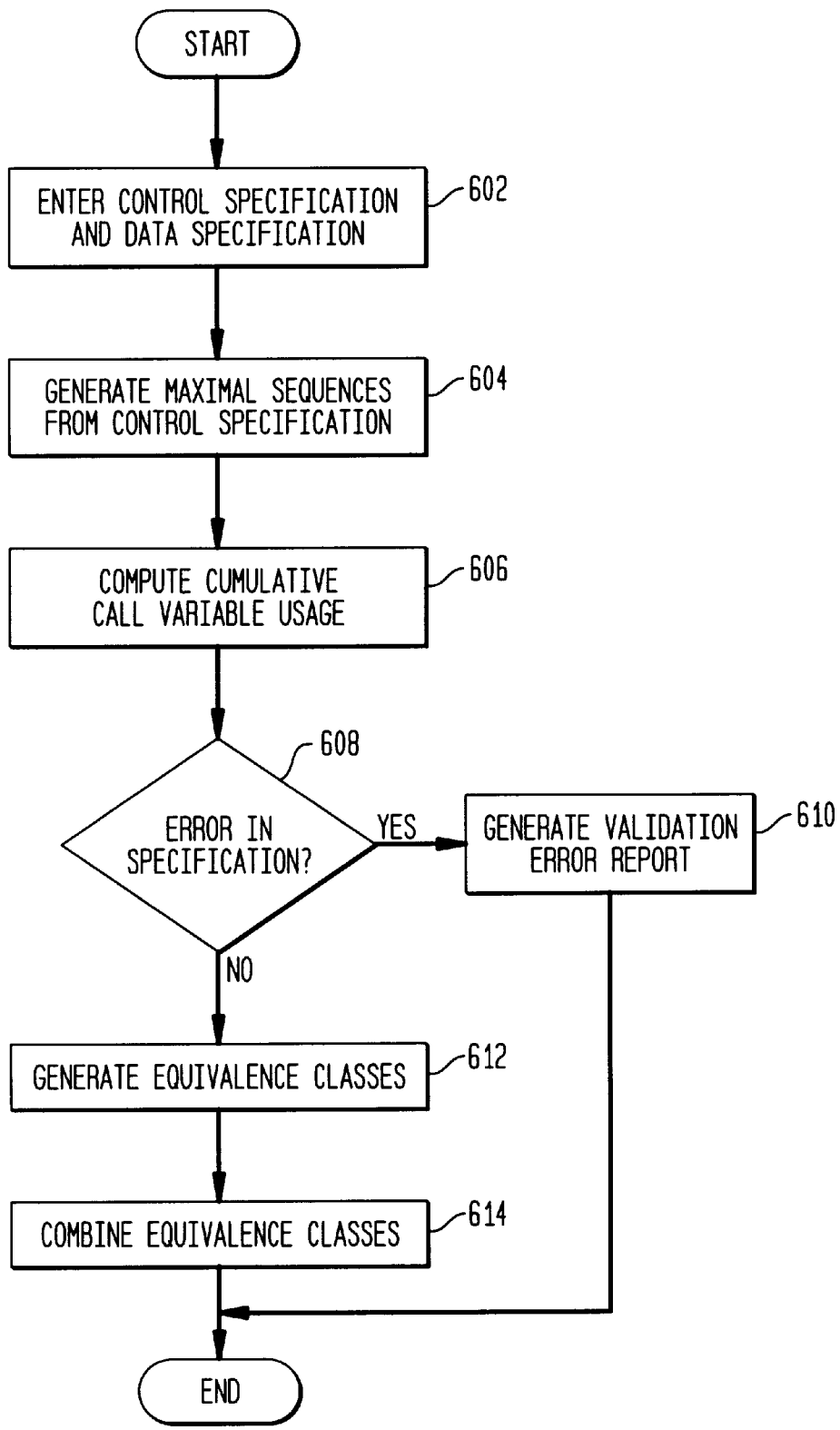
FIG. 6 is a flowchart illustrating steps used in a method for processing an AIN feature in accordance with one embodiment of the present invention.
Figure 7:
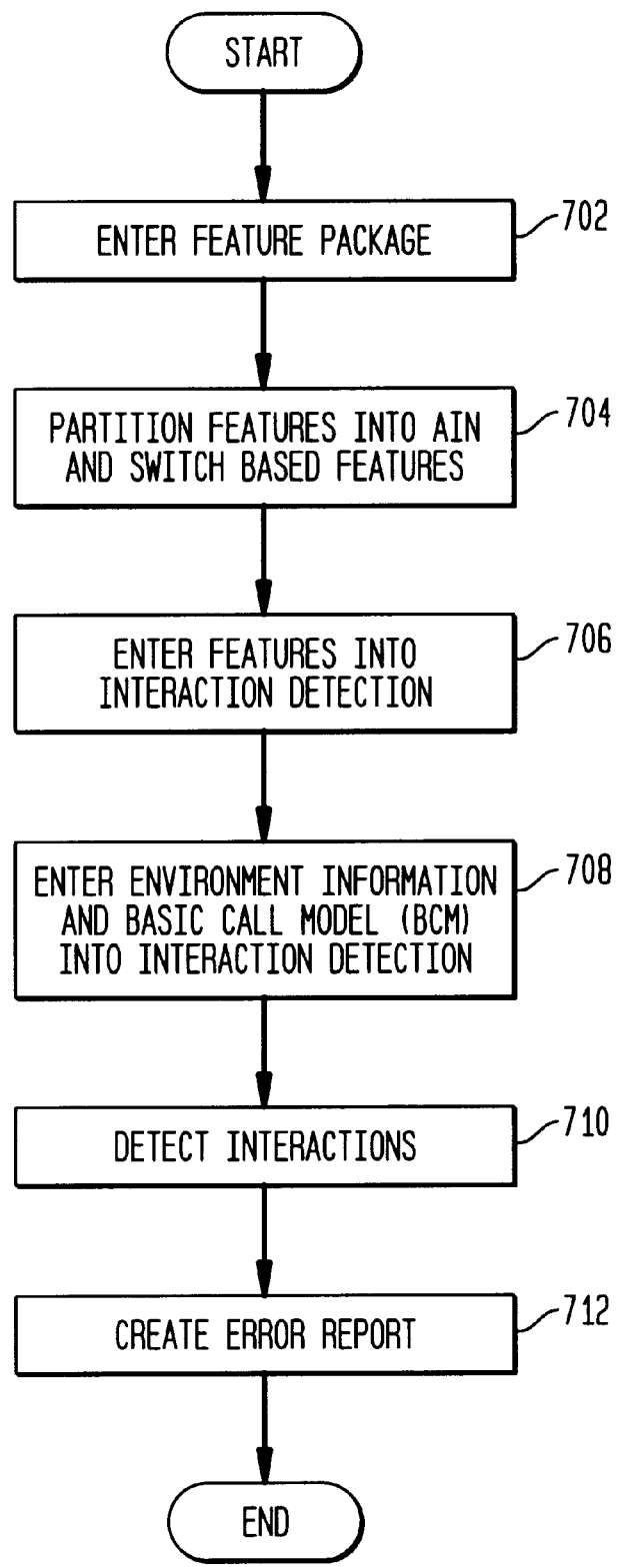
FIG. 7 is a flowchart illustrating steps used in a method for detecting interactions within feature packages in accordance with one embodiment of the present invention.

Methods and systems of detection consistent with the present invention generally run in two phases. In the first phase, message sequences (see section 3.1) are generated for each AIN feature, and the feature specifications are validated, as illustrated in FIG. 6. In the second phase, a package of features is checked for interactions, as illustrated in FIG. 7.

FIG. 6 depicts a flowchart illustrating the processing and validation of an AIN feature. First, the data specification is entered into memory 506 (see FIG. 5) and the control specification is entered into the parser and sequence generator 520 (step 602) in memory 506. Additional steps in this process are detailed below.

3.1. Generating Feature Execution Sequences for AIN features

An AIN feature execution constitutes a finite sequence of message exchanges between the SSP 102 and the SCP 104. The finite sequence of messages exchanged between the SSP 102 and the SCP 104 during a feature execution is called an "execution sequence" for the feature. The feature's behavior is characterized by its set of execution sequences.

Given a trigger for a feature, one can identify the corresponding query message for that trigger. Based on the control specification for a feature, starting with the query message, the system can then construct the set of execution sequences that could occur as a result of the trigger (step 604). To save computing time, the system may generate "maximal" sequences, described below in Section 3.4.2.

3.2. Computing Cumulative Call Variable Usage for AIN Features

Using the data specification of a feature, the cumulative call variable usage for an execution sequence can be computed as follows (step 606). The result will be used for feature interaction analysis as shown in the following section.

Given an execution sequence s, a vector v is used to store the cumulative call variable usage. Each element in v corresponds to a specific call variable. Initially, all elements in v are set to NOOP. Then each element in v is updated by going through each message in s according to the rules specified in Table 10 below. Suppose $v_i$ corresponds to call variable p. Then "Current $v_i$" refers to the cumulative usage of p computed so far; "Operation" refers to the operation performed by the current message on p, and "New $v_i$" is the updated value of the cumulative usage of p. Note that the bold face values in the "New $v_i$" column refer to errors in a feature specification, which will be discussed below in section 3.3.

TABLE 10

| Cumulative Call Variable Usage Updating Rules | | |
|---|---|---|
| Current vi | Operation | New vi |
| NOOP | R | READ |
|  | G | WRITE |
|  | H | NRBH |
|  | U | NRBU |
| READ | R | READ |
|  | G | RBG |
|  | H | READ |
|  | U | READ-WRITE |

TABLE 10-continued

| Cumulative Call Variable Usage Updating Rules | | |
|---|---|---|
| Current vi | Operation | New vi |
| WRITE | R | WRITE-READ |
|  | G | WRITE |
|  | H | NRBH |
|  | U | NRBU |
| READ-WRITE or | R | No Change |
| WRITE-READ | G | RBG |
|  | H | No Change |
|  | U | No Change |

If the feature is correctly specified, then after the last message is processed, v holds the final cumulative call variable usage for s. There are four possible values for each $v_i$: (1) "READ", which means p is only read by the SCP 104 during the execution of s; (2) "WRITE", which means p is only written by the SCP 104 during the execution of s; (3) "READ-WRITE", which means p is both read and written by the SCP 104 during the execution of s, but the first operation by the SCP 104 on p is a read; and (4) "WRITE-READ", which means p is both read and written by SCP 104 during the execution of s, but the first operation by the SCP 104 on p is a write.

The "signature" of an execution sequence is defined as follows: given a sequence s with cumulative call variable usage v, the tuple <s, v> is called the signature of s. The signature <s, v> contains the complete description of s in terms of control and data

3.3. Validation of Individual AIN Features

The purpose of feature validation is to check errors in a feature specification in terms of control and data. If there are any errors (step 608), the system generates a validation error report for the user (step 610). Control errors appear in two forms: syntax and semantics. Syntax errors refer to violations of the rules of Table 4 in a control specification, which can be detected by encoding the rules of Table 4 in a parser. Semantic errors refer to choosing the wrong message and/or component, or missing a message in a control specification. Semantic errors that are feature specific can generally only be detected by design experts. However, some semantic errors can be detected automatically. For example, if a control specification has a response message that carries a Send_Notification component, the parser gives a warning if Rule 6 of Table 4 is not included in the specification.

Data errors, on the other hand, refer to errors in populating call variable usage for messages in data specifications. These errors are caught during the computation of cumulative call variable usage, and they are listed in bold face in Table 10. NRBH (No Read Before "H") and NRBU (No Read before "U") both identify cases when the SCP 104 tries to read or update a call variable value that has not been sent to the SCP 104 for reading in any previous message from the SSP 102. RBG (Read Before "G") indicates another type of error: when the SCP 104 tries to generate a call variable value that has already been sent to the SCP 104 for reading, by the SSP. In this case, a "U" should be used instead if the SCP 104 writes on the call variable. Checking for data errors ensures that the data specification of a feature is consistent with the corresponding control specification.

3.4. Reducing Complexity

Even though the control specification of an AIN feature ensures that the set of execution sequences of the feature is finite, the number of execution sequences of the feature can be very large. There are a number of problems: first, the generation of a complete set of execution sequences is very time-consuming and storing all the sequences requires a lot of disk space; second, the complexity of computing cumulative call variable usage grows linearly with the number of sequences; third, when analyzing interactions among features, the computation of the combined behavior of a set of features may become unmanageable. Collectively, these problems are generally referred to as the "state explosion" problem in analyzing distributed systems.

Methods consistent with the present invention generally use a two-step relief strategy for this problem. First, they reduce the number of execution sequences considered for each individual feature, and second, they reduce the complexity in interaction analysis.

3.4.1. Formalizing the Notion of Interaction

Section 3.1 above explained that an AIN feature's control specification could be used to generate message exchange sequences between the SSP 102 and the SCP 104 for the feature. Thus, an AIN feature is representable as a detection point along with a collection of sequence signatures that are determined via the control and data specifications for that feature. Given the trigger for an AIN feature, it is obvious how the DP and the PIC at which it will occur can be determined (via tables 1(*a*) and (*b*)). Also, section 2.2.2 explained how a switch-based feature could be considered to be a collection of DP signatures. These ideas are formalized using the following definitions.

"Interaction" between AIN features is defiled as follows: two AIN features $F_1$ and $F_2$ can "interact" if $F_1$'s trigger precedes (as discussed in section 1.1) that of $F_2$, and there exist sequences s1 and s2, for $F_1$ and $F_2$ respectively, with signatures <s1, u1> and <s2, u2> respectively and (i) a call variable whose index is i (in the cumulative call variable usage for each sequence) such that $u1_i$=WRITE, READ-WRITE or WRITE-READ and $u2_i$=READ or READ-WRITE, or (ii) $u1_d$=WRITE, READ-WRITE or WRITE-READ, where d is the index of the DisconnectFlag call variable.

"Interaction" between AIN and switch-based features is defined as follows: An AIN feature $F_1$ with DP $D_1$ occurring at PIC $P_1$ and a switch-based feature $F_2$ can "interact" if there exists a sequence "s" with signature <s, u1> for $F_1$ and a DP-signature ($D_2$, $P_2$, u2, $\phi_2$) for $F_2$ such that either $D_1$–$P_1$ precedes $D_2$–$P_2$ and
(i) there exists a call variable whose index is "i" (in the cumulative usage for each sequence) such that $u1_i$=WRITE, READ-WRITE or WRITE-READ and $u2_i$=READ, READ/WRITE, or
(ii) $u1_d$=WRITE, READ-WRITE or WRITE-READ or $D_2$–$P_2$ precedes $D_1$–$P_1$ (as discussed in section 1.5 and defined in tables 5 and 6) and
(i) there exists a call variable whose index is "i" (in the cumulative usage for each sequence) such that $u2_i$=WRITE or READ/WRITE and $u1_i$=READ or READ-WRITE, or
(ii) $u2_d$=WRITE or READ/WRITE.

In either case, d is the index of the DisconnectFlag call variable.

These definitions characterize the class of interactions that are the subject of methods and systems consistent with the present invention. Side-effect interactions, as formalized above, occur when a feature writes a value to a call variable that is read in some way by another feature. A "write" could happen via either WRITE, READ-WRITE, WRITE-READ or READ/WRITE. A "read" could happen via either READ, READ-WRITE or READ/WRITE. Disabling interactions occur when a feature writes a value to the DisconnectFlag call variable. It should be noted that if an AIN feature's DP-PIC pair and a switch-based feature's DP-PIC pair are identical, then their cumulative call variable usages need to be checked in either order. since either can be executed before the other.

3.4.2. Maximal Sequences

An execution sequence is considered to be "maximal" if and only if it is not a prefix or subset of another execution sequence. One only need generate the set of maximal execution sequences for a feature to cover all cumulative call variable usages of a feature.

The maximal sequences for a feature can be generated using all of the TCAP components in a control specification for the generation of message sequences instead of using a subset of these components for some sequences. Using subsets of TCAP components in rules for message sequence generation results in the creation of prefixes of maximal sequences. TCAP component specifications in a control specification are discussed above in section 1.4.

If any interactions exist between features using non-maximal sequences, they can be detected using maximal sequences. A method for generating message sequences for an AIN feature consistent with the present invention as described in section 3.5.1 makes use of this fact and preferably generates the set of maximal sequences.

3.4.3. Equivalence Classes and Combined Representations

For the set of maximal execution sequences generated, the number of sequences considered can be further reduced by introducing an equivalence relation: given two maximal execution sequences s and t, let <s, u> and <t, v> be their respective signatures, s and t are "equivalent," denoted as s_t, if and only if, for every i, $u_i$=$v_i$. The relation "_" partitions the set of maximal execution sequences into equivalence classes. By definition, two execution sequences in the same equivalence class are indistinguishable in terms of data and control. [s] denotes an equivalence class for maximal sequence s and <[s], u> denotes the signature of [s].

Furthermore, if an AIN feature interacts with another due to a particular sequence s, then this interaction can be captured by simply performing the interaction analysis on the equivalence class [s'] for the maximal sequence s' of s. The interaction analysis can be performed by using the cumulative call variable usage of [s'] instead of that of s. Additionally, if an equivalence class shows an interaction involving an AIN feature, then there must exist a sequence for this feature which causes the interaction.

The equivalence classes can be generated by simply grouping generated (maximal) sequences for an AIN feature based on their cumulative call variable usages as has been described in section 3.2 (step 612). They can be used instead of individual sequences for interaction detection between features as mentioned above.

The amount of analysis performed between a pair of features can be further reduced by considering a combined representation for all the equivalence classes for the AIN feature(s). A combined representation maybe generated by stepping though all the generated equivalence classes for the feature to create a "combined call variable usage vector." each of whose components gives the combined usage of a call variable by all the equivalence classes of the feature (step 614). The creation of this combined usage vector starts off by generating a vector v, each of whose components is set to a value of NOOP. At each step in the process, an equivalence class's cumulative call variable usage vector is used to update the value of this vector v. The rules for doing this are described in Table 11. Note the use of the "/" operator as opposed to the "−" operator. This is similar to the "/" operator used in the context of switch-based features' call variable usage in section 2.2.2. The "−" operator has the same semantics as were described in section 3.2 (Table 10) while the "/" operator is an alternation operator.

TABLE 11

Rules for Computing the Combined Cumulative Call Variable Usage Vector

| Current combined vi | Next Equiv. Class' ui | Updated combined vi |
|---|---|---|
| NOOP | Anything | ui |
| READ, READ-WRITE | WRITE, WRITE-READ | READ/WRITE |
| WRITE, WRITE-READ | READ, READ-WRITE | READ/WRITE |
| READ, READ-WRITE | READ-WRITE | READ/WRITE |
| WRITE, WRITE-READ | WRITE-READ | WRITE/READ |
| READ | READ | READ |
| WRITE | WRITE | WRITE |
| READ-WRITE | READ | READ-WRITE |
| WRITE-READ | WRITE | WRITE-READ |
| READ/WRITE | Anything | READ/WRITE |
| Anything | NOOP | No Change |

The significance of the cumulative call variable usage vector can be summarized in the following: if the combined call variable usage for a call variable i is set to (i) X, this means that there exists an equivalence class whose cumulative call variable usage for i is X, (ii)X-Y, there exists an equivalence class whose cumulative call variable usage is X-Y, (iii))X/Y, there exists an equivalence class whose use could be X or X-Y and an equivalence class whose use could be Y or Y-X. Conversely, if there exists an equivalence class whose cumulative call variable usage for i is set to (i) X, the combined call variable usage for i can be either X, X-Y or X/Y, (ii) X-Y, the combined call variable usage for i can be either X-Y or X/Y. (Note that X-Y stands for X preceding Y, X/Y stands for X or Y, and X,Y=READ, WRITE).

The following represents an AIN feature. If an AIN feature has D as its DP, P as the PIC at which this DP occurs, T as its trigger and C as its combined call variable usage vector, the AIN feature can be represented as (D, P. T. c). This is called the "combined representation" of the AIN feature. The combined usage vector, c, can be used in the same manner as outlined in section 3.4.1 for detecting the interactions involving an AIN feature. The only addition is that "READ/WRITE" for a call variable in c, can be considered as a "read" as well as a "write" for the AIN feature. Thus, interactions involving AIN features can be redefined based on their combined representations. In this case, c would be used in almost the same manner as the cumulative call variable usage for a message sequence to check for side effect interactions. D and P would be used when checking for the precedence relation between this AIN feature and a switch-based feature. T would be used to check the precedence relation between this feature and another AIN feature.

Given an AIN feature F1, it will interact with another feature F2 if and only if the combined representation of F1, (D, P, T, c), interacts with F2. This considerably reduces the amount of checking that needs to be done between a pair of features for detecting interactions. Once an interaction is detected involving an AIN feature, the manner of computation of the usage of a call variable in the combined representation of the feature makes it possible to locate an equivalence class that causes the interaction and thus obtain a representative sequence for this class. Using equivalence classes makes the retrieval of representative sequences much easier since one does not need to step through all of the sequences of the AIN feature.

3.4.4. Reducing the Amount of Analysis for a Feature Package

A package of features provided to a subscriber can be composed of multiple AIN and switch-based features. The class of interactions described so far deals with interactions between pairs of features. For the type of interactions involved here, it is sufficient to verify the lack of interactions in an arbitrary feature package by verifying the lack of interactions between every pair of features in the package.

In methods and systems consistent with the present invention, given a package of features, there are no interactions in the package if there are no pairwise interactions between individual features in the package. There is no need to check different subsets of a feature package for interactions if only dealing with AIN 0.1 features that return control to the same PlC as the one at which they triggered. This would be a combinatorially explosive ($O(2^n)$) procedure. Instead, one needs to check individual feature pairs ($O(n^2)$).

3.5. Analysis Algorithms

The data obtained via information modeling (as discussed in section 1) and feature specification (obtained from the user of the system as discussed in section 2) is used as input to two stages of analysis. The first stage of analysis occurs right after an individual AIN feature has been described via its control and data specifications. The end result of this stage is the generation of equivalence classes for this AIN feature (as discussed in section 3.4.3). The second stage of analysis begins when the user wants to check a particular feature package for interactions. It is in this stage that the feature interaction methods consistent with the present invention as outlined with regard to FIG. 4 are used; any interactions in the input package will be detected at the end of this stage. This subsection discusses methods used in these two stages of analysis.

3.5.1. Equivalence Class Generation for an AIN Feature

Generally, the equivalence class generation process has two parts: (1) generation of all possible sequences of TCAP messages 302 exchanged between the SCP 104 and the SSP 102 for a given feature and (2) computing the cumulative call variable usage for each of these sequences (as discussed in section 3.2) and grouping the sequences based on these cumulative call variable usages into equivalence classes.

All possible sequences of TCAP messages 302 exchanged between the SCP 104 and SSP 102 for a given feature are generated from the control specification of the feature (see section 2.1.2.) The sequences of possible TCAP messages 302 exchanged may be determined by starting with a message 302 in the Last_Message_Exchanged column (see Table 7) and determining the corresponding next possible messages, which are listed in Next_Message_Exchanged column. Then, for each next possible message, it can be determined which are the next possible messages from that message that can be exchanged. This may be repeated for each message sequence until there is no next message to be exchanged (i.e., Next_Message_Exchanged is #.) It should be noted, however, that it is most efficient to generate the maximal sequences (see section 3.4.2) for an AIN feature.

Once the complete set of sequences for each feature has been generated, one generates the equivalence classes based on cumulative call variable usage of these sequences. Recall from section 3.4.3 that an equivalence class for a feature is basically a set of maximal sequences for that feature each of which has the same cumulative call variable usage. Initially, the set of equivalence classes is empty. The cumulative call variable usage for each sequence is computed by stepping through every message of the sequence and updating a cumulative call variable usage vector as discussed in section 3.2. After the cumulative call variable usage vector has been computed for a sequence, the former is compared with all the cumulative call variable usage vectors computed for currently generated equivalence classes. In case the Current cumulative call variable usage vector has already been computed in some previous equivalence class, this sequence becomes a part of that class; otherwise a new equivalence class, with this sequence as the sole current member, is created. Once the cumulative call variable usages for each of these sequences are computed, the equivalence classes for this feature have also been generated.

3.5.2. Detecting Interactions in a Package of Features

Given a package of features comprised of both AIN and switch-based features, interactions between features can be detected using the specifications of these features as input by the user along with the information generated as described in the previous section. Also, because of the way these features have been modeled, it is possible to detect these interactions by processing one pair of features at a time.

FIG. 7 depicts a flowchart illustrating a method for detecting interactions in a package of features consistent with the present invention. First, a feature package is created by a user using the features stored in the library 528 (step 702). The entered features are partitioned between AIN features and switch-based features by the partitioner 524 (step 704) residing in memory 506. These features are entered into the interaction detector 522 (step 706) along with the information model including the BCM 526 of the AIN network in which the features will operate (step 708). Then, the interaction detector 522 uses this information to detect interactions between the features (step 710).

To simplify the detection, all the equivalence classes of a feature are combined into a single representation. This single representation is basically a single cumulative call variable usage vector for that feature. It is computed from the individual cumulative call variable usages of each equivalence class as discussed in section 3.4.3.

The interaction between an AIN feature and another AIN feature is detected via the following procedure:

i) Determine the order in which the features would fire based on the triggers for these features.

ii) Based on this ordering check the combined representation vector of each feature to see if the preceding feature writes a value to a call variable that the succeeding feature reads, or if the preceding feature writes to the DisconnectFlag call variable.

The same steps are followed for interaction detection between AIN and switch-based features. The slight difference here is that since a switch-based feature can have multiple detection points, the system needs to check the interaction between the call variable usage for a switch-based feature at each detection point for this feature (as described in section 2.2) and the combined representation vector for the AIN feature.

In case any interactions are detected in the steps outlined above, the system extracts (for AIN features) all the equivalence classes that are causing this interaction, along with a few representative sequences from each class, for display to the user (step 712). This error report helps the user of the system to get a more detailed idea of how the interaction is happening.

3.5.3. Feature Interaction Example

The following example illustrates the interaction detection discussed in section 3.5.2 above. Although a package composed of only two features is considered here, this interaction, as shown above, would be caught even if features other than these were present in the package.

This example illustrates the detection of a side-effect interaction. It considers a package composed of the features Call Forwarding Variable and NPA-NXX screening which were described in section 2. Interaction analysis of this package reveals that when Call Forwarding Variable is activated at the Origination_Attempt DP and NPA-NXX screening is triggered at the Info_Analyzed DP during a call, the former is seen to write a value to the call variable CalledPartyID, and the latter is seen to read this variable. It is possible for the subscriber of this package to see unexpected results because of this interaction. Let the subscriber's telephone number be M. If the subscriber decides to have all calls to M forwarded to another number N, without considering the fact that N is on the screening list of the NPA-NXX feature, the net result would be that the subscriber would not receive any forwarded calls from M at N, which is clearly not expected by the subscriber. Thus, in this case, a potential interaction detected by methods and systems consistent with the present invention could result in a feature interaction in a practical situation.

What is claimed is:

1. A method for detecting feature interaction between a first Service Control Point (SCP) based feature and a second SCP-based feature in a call processing network, said method comprising the steps of:

using relational database models to model originating and terminating basic call models and to tie Transaction Capabilities Application Part (TCAP) messages to the originating and terminating basic call models;

modeling the first feature and the second feature based on TCAP messages and TCAP call variables wherein the resultant first and second feature models are distinct from said relational database models representing the basic call models;

determining from said first feature model a set of TCAP message sequences that can occur when executing the first feature and from said second feature model a set of TCAP message sequences that can occur when executing the second feature;

determining from said first feature model a call variable usage vector for each TCAP message sequence within the set of TCAP message sequences for the first feature and from said second feature model a call variable usage vector for each TCAP message sequence within the set of TCAP message sequences for the second feature, wherein the call variable usage vectors indicate how the corresponding TCAP message sequence uses call variables; and detecting feature interaction by comparing, through use of the relational database models representing the basic call models, the call variable usage vectors of the first feature against the call variable usage vectors of the second feature.

2. The method of claim 1, wherein the step of modeling the first and second features further includes the step of:

modeling the first and second features using a relational database.

3. The method of claim 1, wherein the call processing network is an AIN Release 0.1 network, and wherein the originating and terminating basic call models are AIN Release 0.1 originating and terminating basic call models.

4. The method of claim 1, wherein the step of determining the set of TCAP message sequences for the first and second features further includes the step of:
  reducing the number of TCAP message sequences by grouping the message sequences for each feature into equivalence classes based on an equivalence relation;
  wherein the step of determining the call variable usage vectors for the first and second features further includes the steps of:
    reducing the number of call variable usage vectors by determining one call variable usage vector for each of the equivalence classes of a given feature; and
    combining the call variable usage vectors among each of the equivalence classes of a given feature into a single call variable usage vector; and
  wherein the step of detecting feature interaction only requires:
    detecting feature interaction by comparing, through use of the relational database models representing the basic call models, the single combined call variable usage vector of the first feature against the single combined call variable usage vector of the second feature.

5. The method of claim 4 wherein the first feature is a switch-based feature,
  wherein the step of modeling the first and second features requires modeling the first switch-based feature based only on TCAP call variables;
  wherein the step of determining call variable usage vectors requires determining from said first switch-based feature model, call variable usage patterns for the first switch-based feature, wherein the call variable usage patterns indicate how the first switch-based feature uses TCAP variables and wherein the call variable usage patterns are independent of TCAP message sequences; and
  wherein the step of detecting feature interaction requires detecting feature interaction by comparing, through use of the relational database models representing the basic call models, the call variable usage patterns of the first switch-based feature against the single combined call variable usage vector of the second SCP-based feature.

6. The method of claim 5, wherein the step of modeling the first and second features includes modeling a set of features wherein said set of features includes said first and second features.

7. The method of claim 6, wherein the step of detecting feature interaction requires:
  comparing the combined call variable usage vectors and/or call variable usage patterns in a pairwise manner.

8. A method for feature interaction detection in a call processing network, comprising the steps of:
  modeling originating and terminating basic call models;
  modeling a plurality of features based on TCAP messages wherein the resultant feature models are distinct from the models representing the basic call models;
  generating call variable usage vectors for each of the plurality of features from the model of each feature wherein the call variable usage vectors for a given feature represent how that feature affects call variables;
  reducing the number of call variable usage vectors for each of the plurality of features by eliminating redundant call data usage information through the use of equivalence classes; and
  detecting feature interaction among the plurality of features by comparing, through use of the models representing the basic call models, the reduced number of call variable usage vectors of the plurality of features in a pairwise manner.

9. Computer-readable memory containing instructions for controlling a data processing system to perform a method for detecting feature interaction in call processing network, the method comprising the steps of:
  modeling originating and terminating basic call models;
  modeling a first feature and a second feature based on TCAP messages wherein the resultant feature models are distinct from the models representing the basic call models;
  generating call variable usage vectors for the first feature from the first feature model wherein the call variable usage vectors represent how the feature affects call variables;
  reducing the number of call variable usage vectors of the first feature by eliminating redundant call data usage information through the use of equivalence classes;
  generating call variable usage vectors for the second feature from the second feature model wherein the call variable usage vectors represent how the feature affects call variables;
  reducing the number of call variable usage vectors of the second feature by eliminating redundant call data usage information through the use of equivalence classes; and
  comparing, through use of the models representing the basic call models, the reduced call variable usage vectors of the first feature to the reduced call variable usage vectors of the second feature to detect a feature interaction.

10. A system for detecting feature interaction between a first Service Control Point (SCP) based feature and a second SCP-based feature in a call processing network, said system comprising:
  means for using relational database models to model originating and terminating basic call models and to tie Transaction Capabilities Application Part (TCAP) messages to the originating and terminating basic call models;
  means for modeling the first feature and the second feature based on TCAP messages and TCAP call variables wherein the resultant first and second feature models are distinct from said relational database models representing the basic call models;
  means for determining from said first feature model a set of TCAP message sequences that can occur when executing the first feature and from said second feature model a set of TCAP message sequences that can occur when executing the second feature;
  means for determining from said first feature model a call variable usage vector for each TCAP message sequence within the set of TCAP message sequences for the first feature and from said second feature model a call variable usage vector for each TCAP message sequence within the set of TCAP message sequences for the second feature, wherein the call variable usage vectors indicate how the corresponding TCAP message sequence uses call variables; and
  means for detecting feature interaction by comparing, through use of the relational database models representing the basic call models, the call variable usage vectors of the first feature against the call variable usage vectors of the second feature.

11. The system of claim 10, wherein the means for determining the set of message sequences for the first and second features further includes:

means for reducing the number of TCAP message sequences by grouping the message sequences for each feature into equivalence classes based on an equivalence relation;

wherein the means for determining the call variable usage vectors for the first and second features farther includes;

means for reducing the number of call variable usage vectors by determining one call variable usage vector for each of the equivalence classes of a given feature; and means for combining the call variable usage vectors among each of the equivalence classes of a given feature into a single call variable usage vector; and wherein the means for detecting feature interaction only requires:

means for detecting feature interaction by comparing, through use of the relational database models representing the basic call models, the single combined call variable usage vector of the first feature against the single combined call variable usage vector of the second feature.

12. The system of claim 11 wherein the first feature is a switch-based feature, wherein the means for modeling the first and second features requires means for modeling the first switch-based feature based only on TCAP call variables;

wherein the means for determining call variable usage vectors requires means for determining from said first switch-based feature model, call variable usage patterns for the first switch-based feature, wherein the call variable usage patterns indicate how the first switch-based feature uses TCAP variables and wherein the call variable usage patterns are independent of TCAP message sequences; and wherein the means for detecting feature interaction requires means for detecting feature interaction by comparing, through use of the relational database models representing the basic call models, the call variable usage patterns of the first switch-based feature against the single combined call variable usage vector of the second SCP-based feature.

* * * * *